(12) United States Patent
Sugaya et al.

(10) Patent No.: US 10,394,541 B2
(45) Date of Patent: Aug. 27, 2019

(54) SYSTEM, METHOD, AND PROGRAM FOR DISTRIBUTING CONTAINER IMAGE

(71) Applicant: OPTiM Corporation, Saga-shi (JP)

(72) Inventors: Shunji Sugaya, Tokyo (JP); Tatsuhiko Nakano, Tokyo (JP); Daisuke Yamamoto, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 15/534,584

(22) PCT Filed: Jul. 27, 2016

(86) PCT No.: PCT/JP2016/072024
§ 371 (c)(1),
(2) Date: Jun. 9, 2017

(87) PCT Pub. No.: WO2018/020610
PCT Pub. Date: Feb. 1, 2018

(65) Prior Publication Data
US 2019/0138286 A1    May 9, 2019

(51) Int. Cl.
*G06F 8/61* (2018.01)
*G06F 9/445* (2018.01)

(52) U.S. Cl.
CPC .............. *G06F 8/63* (2013.01); *G06F 9/445* (2013.01)

(58) Field of Classification Search
None
See application file for complete search history.

(56) References Cited

U.S. PATENT DOCUMENTS

| | | | |
|---|---|---|---|
| 9,256,467 B1* | 2/2016 | Singh | G06F 9/5055 |
| 2005/0060722 A1* | 3/2005 | Rochette | G06F 8/60 |
| | | | 719/319 |
| 2012/0054716 A1* | 3/2012 | Tailliez | G06F 8/61 |
| | | | 717/107 |
| 2015/0060722 A1 | 3/2015 | Rochette et al. | |
| 2017/0353541 A1* | 12/2017 | Higashi | H04L 67/1031 |
| 2018/0075152 A1* | 3/2018 | Zhang | G06F 9/5083 |

OTHER PUBLICATIONS

Wikipedia, "App Store," online, retrieved on Jul. 9, 2016, Internet, https://ja.wikipedia.org/wiki/App_Store.
A comprehensive understanding of Linux Kernel, "Chapter 6. Container Technique to be reckoned with Part 4 Application Deployment-Based Docker", p. 98-99, Nikkei Business Publications, Inc., Nov. 29, 2014.
A comprehensive understanding of Linux Kernel, Nikkei Business Publications, Inc., Nov. 29, 2014, p. 98-99.

* cited by examiner

*Primary Examiner* — Philip Wang
(74) *Attorney, Agent, or Firm* — Lex IP Meister, PLLC

(57) ABSTRACT

The present invention is to provide a system, a method, and a program for distributing a container image that do not need to previously prepare the execution environment for individual terminals and external systems on the execution of a predetermined application on a terminal and an external system. The system for distributing a container image registers a container image that includes an application and a program group for the execution environment of the application; receives start instruction from a user to start the registered container image; receives selection of a platform that distributes the container image instructed to be started, from the user; and distributes the container image instructed to be started to the selected platform.

5 Claims, 5 Drawing Sheets

SYSTEM, METHOD, AND PROGRAM FOR DISTRIBUTING CONTAINER IMAGE

TECHNICAL FIELD

The present invention relates to a system, a method, and a program for distributing a container image that pertain to container image distribution.

BACKGROUND ART

In the spread of smart phones and tablet terminals in recent years, it is known to distribute a program to run on these terminals in the form of application distribution. The users access a server that has a predetermined WEB address from a dedicated application and a browser through the Internet, downloads an application from the server, and executes it (Non-Patent Document 1).

Since such application distribution, as its name suggests, is to distribute only an application as the upper layer, all the terminals in which the application can be installed are basically assumed to apply a common operating system.

CITATION LIST

Non-Patent Literature

Non-Patent Document 1: Wikipedia, "App Store," online, retrieved on Jul. 9, 2016, Internet, https://ja.wikipedia.org/wiki/App_Store

SUMMARY OF INVENTION

However, when an application is executed on a terminal, the execution environment may be necessary. In other words, the execution environment is unnecessary for binaries executable by itself that are created in the C/C++ language and the Go language and but necessary for binaries that are created in Ruby, Python, and Java®, etc. The execution environment should be previously installed in terminals for the latter binaries.

This is not only for a terminal but also for an external system such as a data center to execute an application. Thus, such external system may need the execution environment to operate an application. In this case, it is necessary to prepare the execution environment for the external system as well.

An objective of the present invention is to provide a system, a method, and a program for distributing a container image that do not need to previously prepare the execution environment for individual terminals and external systems on the execution of a predetermined application on these terminals and external systems.

The first aspect of the present invention provides a system for distributing a container image, including:

a container image registration unit that registers a container image that includes an application and a program group for the execution environment of the application;

a start instruction receiving unit that receives start instruction to start the registered container image;

a platform selection receiving unit that receives selection of a platform that distributes the container image instructed to be started; and a container image distribution unit that distributes the container image instructed to be started to the selected platform.

According to the first aspect of the present invention, a system for distributing a container image registers a container image that includes an application and a program group for the execution environment of the application, receives start instruction to start the registered container image, receives selection of a platform that distributes the container image instructed to be started, and distributes the container image instructed to be started to the selected platform.

The first aspect of the present invention is the category of a system for distributing a container image, but the category of a method or a program for distributing a container image has similar functions and effects.

The second aspect of the present invention provides the system according to the first aspect of the present invention, further including a container image purchase receiving unit that receives purchase of a container image to be used from user.

The third aspect of the present invention provides the system according to the first or the second aspect of the present invention, further including: a re-distribution control unit that controls the platform to have an external system to re-distribute the container image distributed to the platform; and a container creation instructing unit that instructs the platform to create a container from the container image re-distributed on the external system.

The fourth aspect of the present invention provides the system according to any one of the first to the third aspect of the present invention, in which the program group for the execution environment of the application is a distribution file to apply the operating system file if the group is a computer-executable file type, and the program group for the execution environment of the application is a part of the distribution file, the runtime file, and the library file to apply the operating system if the group is not a computer-executable file type.

According to the present invention, the execution environment is not necessary to be prepared for individual terminals and external systems on the execution of a predetermined application on a terminal and an external system.

DESCRIPTION OF EMBODIMENTS

Embodiments of the present invention will be described below with reference to the attached drawings. However, this is illustrative only, and the technological scope of the present invention is not limited thereto.

Technical Background

The background of the technical field will be described below with reference to FIGS. 1 and 2.

Figure 1:
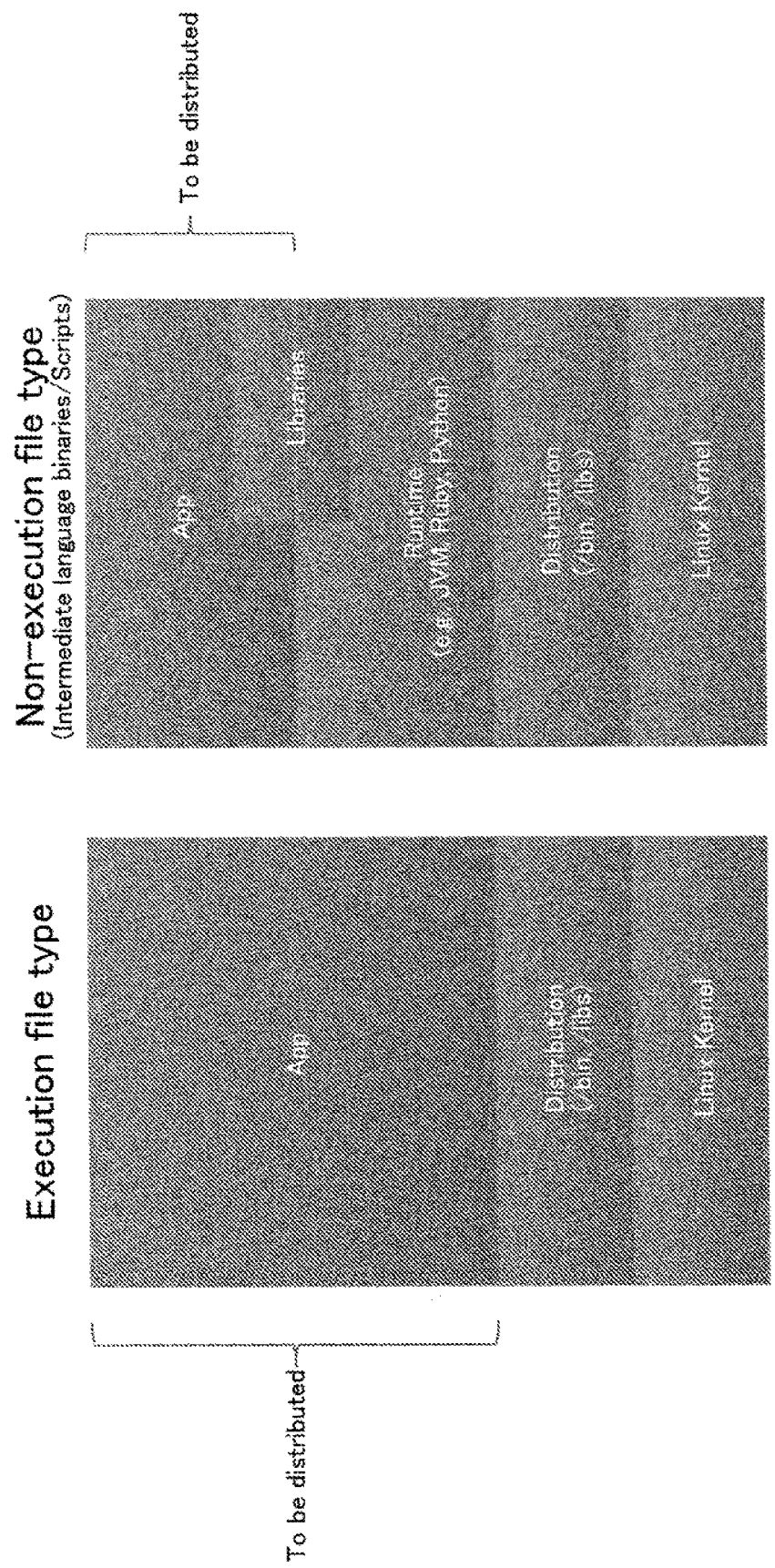
FIG. 1 shows a schematic diagram of conventional application distribution.

As shown in FIG. 1, programs that run on a computer are divided into classes. There are a kernel in the lowermost layer that is the nearest to the hardware, a distribution file in the middle layer to control the kernel, and an application program that runs in the upper layer. If the lowermost layer is the same as the middle layer, an application program can be executed by only its distribution.

This is the case when the application program is an "execution file type" which can be executed by itself. However, "non-execution file types" such as intermediate language binaries and scripts cannot be executed without distributing a part of a library file together with the application program. Thus, distributing a part of a library file together with the application program enables the application program to run on many computers.

Figure 2:
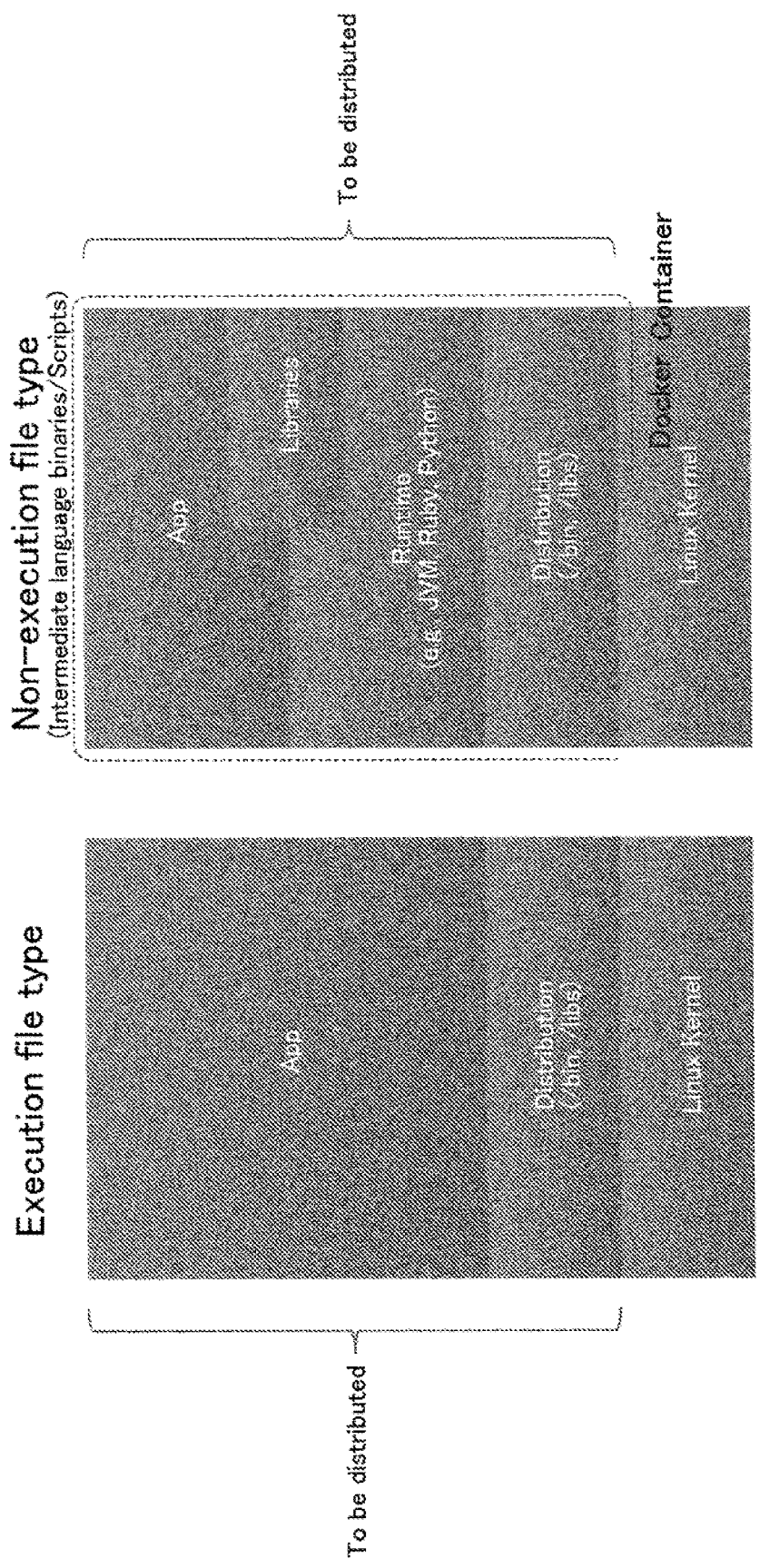
FIG. 2 shows a schematic diagram of application distribution according to the present invention.

On the other hand, in the best mode of the embodiments of the present invention, the parts other than the kernel as the lowermost layer, which are the middle layer and the application program, are distributed as a container as shown in FIG. 2. Specifically, in addition to an application program, a distribution file is distributed if the application program is execution file type, and a runtime file and a library file are also distributed if the application program is non-execution file type.

There are different containers if the above-mentioned containers contain a same application program but a different program, etc., (program group) in the middle layer. The different two or more kinds of containers are put together into a container image. A developer who developed an application prepares the execution environment such as the middle layer and the application that runs in the execution environment in a set according to a platform, an edge computer, and an external system that execute the application. Then, the developer creates (encapsulates) one container from this set and put two or more containers together into a container image according to different platforms, etc.

For example, the container is a program group applying the container type virtualization technology. The container type virtualization technology creates a container to be an isolation space on a host OS so as to run different OS environments in each isolated space. As examples of the technology, "Docker," "Rocket," "Linux® Container," and "OpenVZ," "LXD," and "Virtuozzo" are known. To run the container image, a container type virtualization tool (e.g., Docker engine) should be installed in the OS environment of a host in a computer.

System for Distributing Container Image

Figure 3:
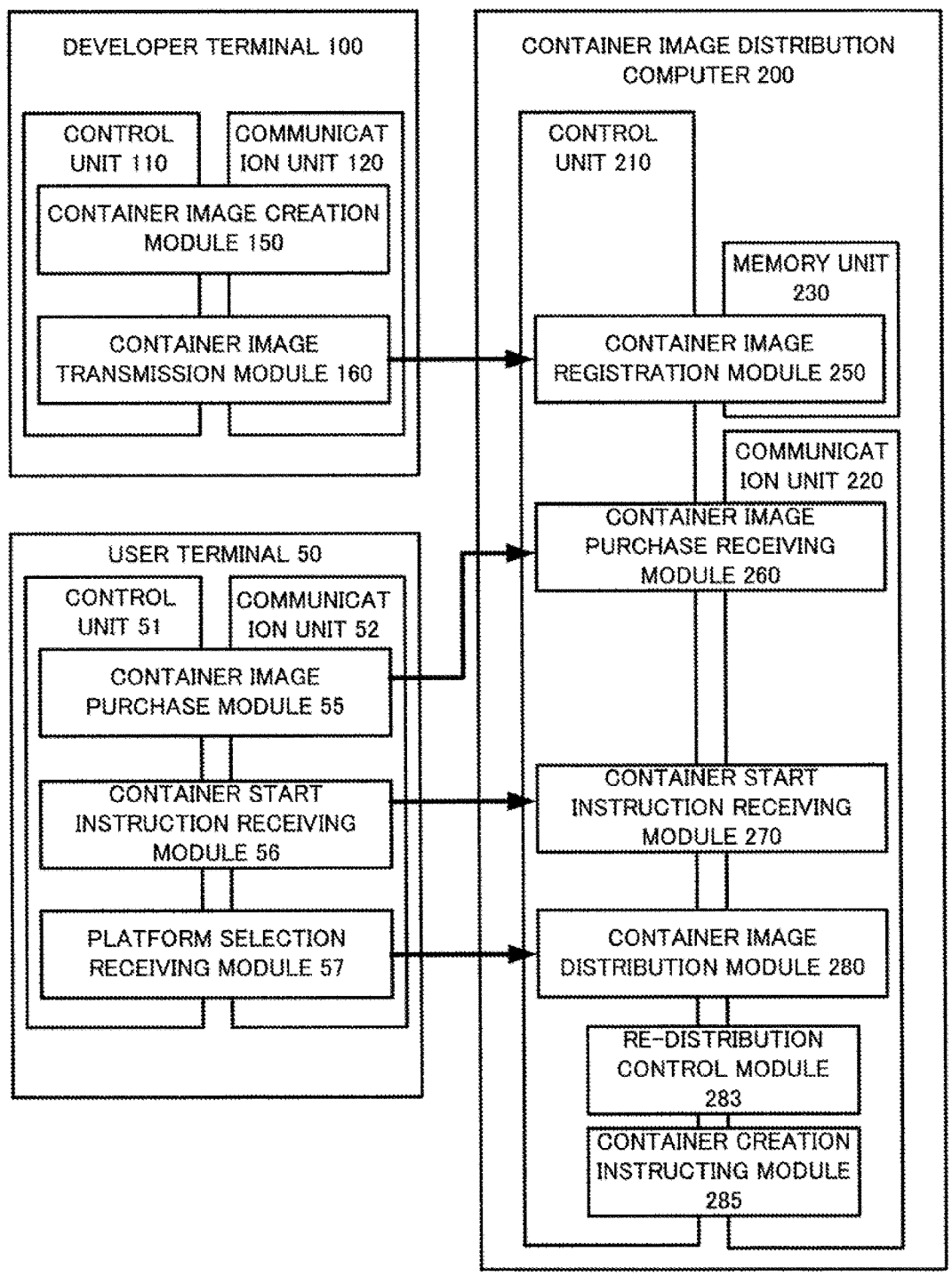
FIG. 3 shows a functional block diagram of the developer terminal 100, the user terminal 50, and the container image distribution computer 200.

A preferable embodiment of the present invention will be described below with reference to FIG. 3. FIG. 3 shows a configuration of the system for distributing a container image 1 according to a preferable embodiment of the present invention and also shows a functional block of the units. The system for distributing a container image 1 at least includes a container image distribution computer 200, a developer terminal 100, and a user terminal 50 and may also contain a platform computer, a schedule computer for edge, an external system, and an edge computer that are to be described later.

The developer terminal 100 is used by a developer who develops an application. The user terminal 50 is used by a user who uses the application that the developer developed. These terminals equivalent to the number of developers and users are connected with the container image distribution computer 200. The developer terminal 100 and the user terminal 50 may be communicatively connected with the container image distribution computer 200 through the Internet.

The developer terminal 100, the user terminal 50, and the container image distribution computer 200 are terminal devices with a capability of data communication. Examples of the developer terminal 100 and the user terminal 50 include electrical appliances such as a notebook computer, a smart phone, a mobile phone, a mobile information terminal, a tablet terminal, a personal computer, a net book terminal, a slate terminal, an electronic book terminal, and a portable music player, and wearable terminals such as smart glasses and a head mounted display.

The developer terminal 100 may include a control unit 110 such as a central processing unit (hereinafter referred to as "CPU"), a random access memory (hereinafter referred to as "RAM"), and a read only memory (hereinafter referred to as "ROM"), etc., and a communication unit 120 such as a device that is capable to communicate with other devices, for example a Wireless Fidelity or Wi-Fi® enabled device complying with IEEE 802.11. The developer terminal 100 may also include a memory unit such as a hard disk, a semiconductor memory, a record medium, or a memory card to store data. The developer terminal 100 may also include an input-output unit such as a display unit outputting and displaying data and images that were processed by the control unit; and also including an input unit such as a touch panel, a keyboard, or a mouse that receives an input from a user.

In the developer terminal 100, the control unit 110 reads a predetermined program to achieve a container image creation module 150 and a container image transmission module 160 in cooperation with the communication unit 120.

The user terminal 50 includes a control unit 51 provided with a CPU, a RAM, and a ROM; and a communication unit 52 such as a device that is capable to communicate with other devices, for example, a Wireless Fidelity or Wi-Fi® enabled device complying with IEEE 802.11. The user terminal 50 may also include a memory unit such as a hard disk, a semiconductor memory, a record medium, or a memory card to store data. The user terminal 50 may also include an input-output unit such as a display unit outputting and displaying data and images that were processed by the control unit; and also including an input unit such as a touch panel, a keyboard, or a mouse that receives an input from a user.

In the user terminal 50, the control unit 51 reads a predetermined program to achieve a container image purchase module 55, a container start instruction receiving module 56, a platform selection receiving module 57 in cooperation with the communication unit 52.

The container image distribution computer 200 includes a control unit 210 provided with a central processing unit (hereinafter referred to as "CPU"), a random access memory (hereinafter referred to as "RAM"), a read only memory (hereinafter referred to as "ROM"), etc.; and a communication unit 220 such as a device that is capable to communicate with other devices, for example, an interface for wired LAN connection, and a Wireless Fidelity or Wi-Fi® enabled device complying with IEEE 802.11. The container image distribution computer 200 may also include a memory unit 230 such as a hard disk, a semiconductor memory, a record medium, or a memory card to store data.

In the container image distribution computer 200, the control unit 210 reads a predetermined program to achieve a container image registration module 250 in cooperation with the memory unit 230. Furthermore, in the container image distribution computer 200, the control unit 210 reads a container image purchase receiving module 260, a container start instruction receiving module 270, a container image distribution module 280, optionally, a re-distribution control module 283, and a container creation instructing module 285 in cooperation with the communication unit 220.

Container Image Distribution Process

Figure 4:
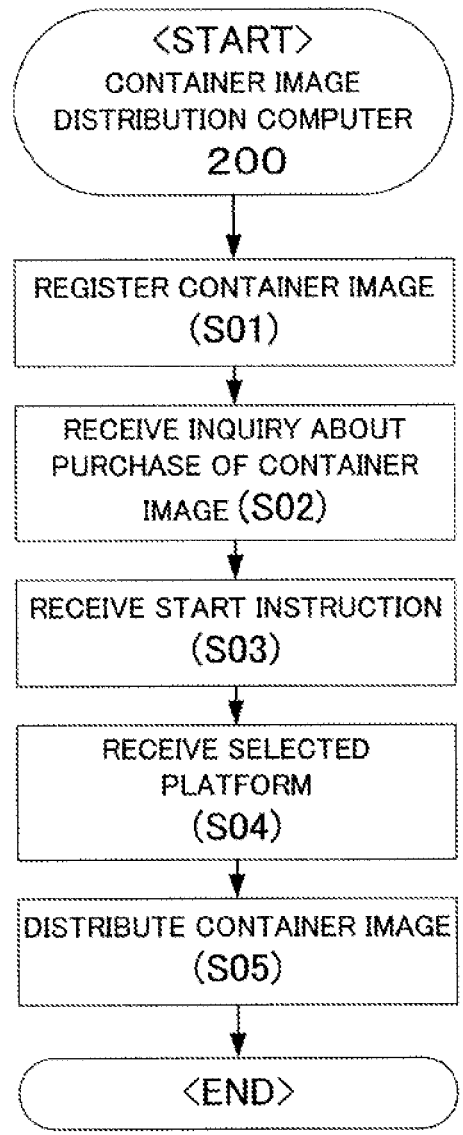
FIG. 4 shows a container image distribution process performed by the container image distribution computer 200.

The container image distribution process performed by the container image distribution computer 200, and other terminals and computers will be described with reference to FIG. 4. First, a developer accesses the developer terminal 100 and the container image distribution computer 200 to develop an application. For example, a developer develops a bot (automated program), an engine, etc., as the application program.

Then, the developer creates a container to contain a program group to be the execution environment corresponding to the developed application. The container image creation module 150 of the developer terminal 100 encapsulates two or more created containers in one container image. Since the execution environment is different according to computers such as platforms and external systems that run a container, two or more different containers are created. The container image creation module 150 is provided in the container image distribution computer 200 so that the container image distribution computer 200 may encapsulate containers in a container. If the container image creation process is performed by the developer terminal 100, the container image transmission module 160 transmits the created container image to the container image distribution computer 200.

Then, the container image registration module 250 of the container image distribution computer 200 receives the container image transmitted from the developer terminal 100 and registers the received container image (Step S01). If the container image is created by the container image distribution computer 200, the container image registration module 250 merely registers the created container image.

In the registration of a container image, the container image is associated with the user ID of a developer and a serial ID and stored in the memory unit 230 of the container image distribution computer 200.

Then, the container image distribution computer 200 receives an application for the registered container image from the user of the user terminal 50. The user terminal 50 outputs the list of the container images from the user. In response to an input from the user, the container image purchase module 55 inquires the purchase of a predetermined container image of the container image distribution computer 200. The container image purchase receiving module 260 of the container image distribution computer 200 receives inquiry about the purchase (Step S02).

The container image purchase receiving module 260 performs the purchase process such as credit-card transaction for the user and permits the use of the selected container image.

Then, the container start instruction receiving module 56 receives the start instruction of the purchased container image from the user who operates the user terminal 50 or a different terminal (not shown in the attached drawings) and transmits the start instruction to the container image distribution computer 200. The container image start instruction receiving module 270 of the container image distribution computer 200 receives the start instruction (Step S03). Although receiving from the user who operates a terminal, the container image start instruction receiving module 270 may receive the start instruction of a container image when the user starts or operates a predetermined application. When a container image is started, containers are created (containerized) from the container image.

Almost at the same time as the step S03, the platform selection receiving module 57 receives the selection of a platform from the user who instructs the start. Then, the user terminal 50 or a different terminal (not shown in the attached drawings) receives the selection of a platform on which the user is going to start the container image and transmits the selection to the container image distribution computer 200.

The container image distribution module 280 of the container image distribution computer 200 receives the selected platform (Step S04) and distributes the container image to this platform (Step S05).

The platform is computer hardware that distributes the container image and containerizes containers. For example, the platform may be a computer (or a plurality of computers) that provides Platform as a Service (referred to as "PaaS"), a terminal computer or a computer device that is referred to as an edge (fog) computer, or a computer (schedule computer for edge) to schedule the operation of a microcomputer.

Each platform needs an individually different execution environment on the execution of an application. Thus, a container appropriate for the platform is distributed from a container image, so that an application in the upper layer can be executed in the platform. Instead of a container image, only a container appropriate for a platform may be distributed to the platform.

The container may be run on a computer that achieves a platform. However, the container image may be re-distributed to a computer such as an external system or a schedule computer for edge to create a container in these computers. In this case, the re-distribution control module 283 of the container image distribution computer 200 controls the selected platform to re-distribute a container image to a destination target computer so that the container creation instructing module 285 creates a container appropriate for the computer (e.g., external system) from the container image.

Figure 5:
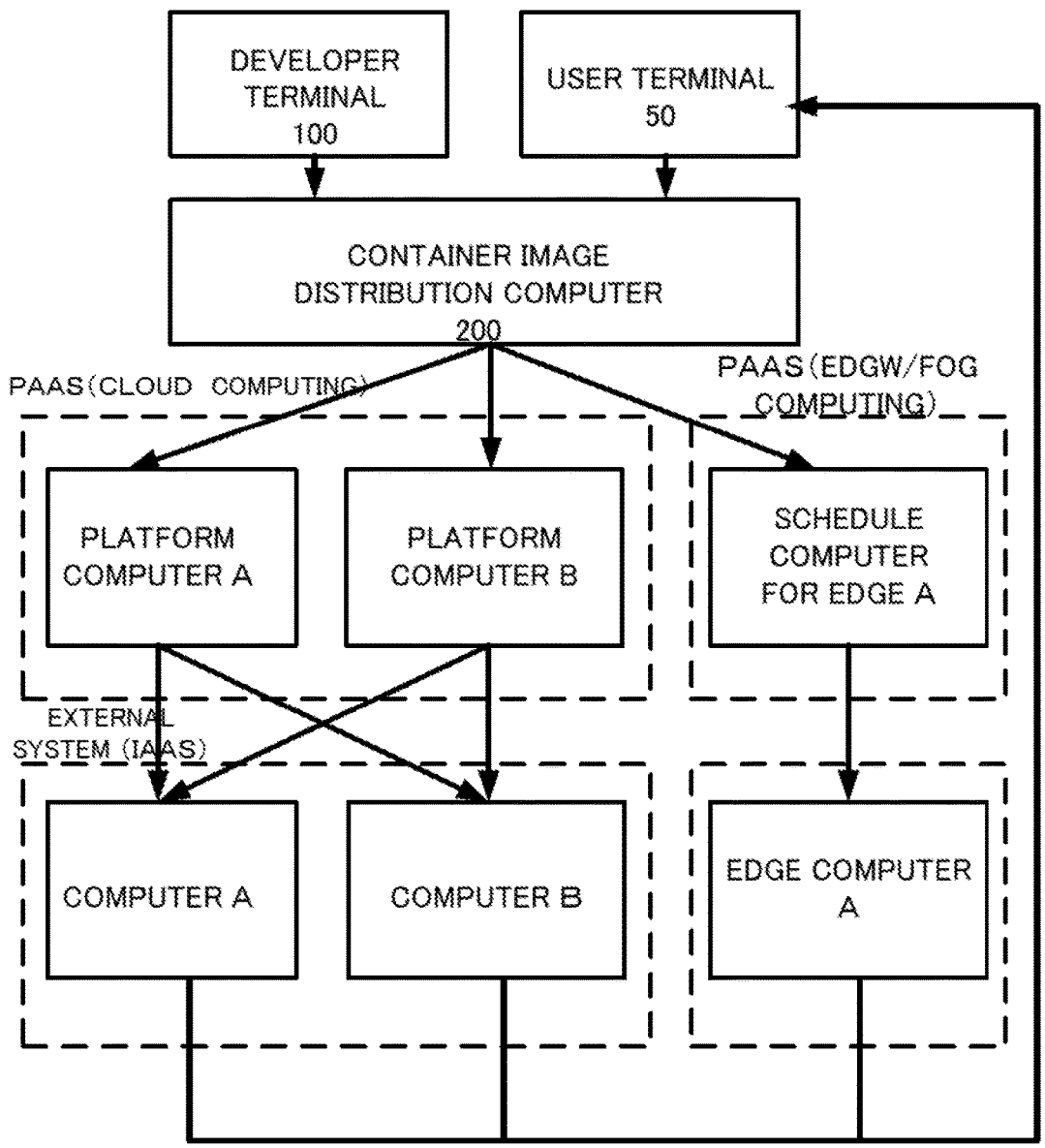
FIG. 5 shows that the container image distribution computer 200 has a platform and an external system to distribute and process a container image.

Regarding the re-distribution, the container image distribution computer 200 distributes a container image to the computer A, B as a platform or the schedule computer for edge A as shown in FIG. 5. If necessary, the computer A, B as a platform re-distributes the container image to the computer A, B as an external system and the edge computer A. The execution environment necessary for an external system or an edge computer supports not only the application but also the middle layer by the distribution of a container image and the creation of a container. Thus, although distributed to computers, the same container image can be run appropriately on each computer.

After a container image is distributed or re-distributed, the result of an application executed on a platform and a computer is transmitted to the terminal such as the user terminal 50, etc., (FIG. 5 shows only the computer A, B, and the edge computer A). The result may be transmitted to not only the user terminal 50 but also other terminals.

To achieve the means and the functions that are described above, a computer (including a CPU, an information processor, and various terminals) reads and executes a predetermined program. For example, the program is provided in the form recorded in a computer-readable medium such as a flexible disk, CD (e.g., CD-ROM), or DVD (e.g., DVD-ROM, DVD-RAM). In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to those described in the embodiments of the present invention.

REFERENCE SIGNS LIST 50 user terminal
100 developer terminal
200 container image distribution computer

What is claimed is:

1. A system for distributing a container image, comprising:
   a container image registration unit that registers a container image that includes an application and a program group for the execution environment of the application;
   a start instruction receiving unit that receives start instruction to start the registered container image;
   a platform selection receiving unit that receives selection of a platform that distributes the container image instructed to be started;
   a container image distribution unit that distributes the container image instructed to be started to the selected platform;
   a re-distribution control unit that controls the platform to have an external system to re-distribute the container image distributed to the platform; and
   a container creation instructing unit that instructs the platform to create a container from the container image re-distributed on the external system.

2. The system according to claim 1, further comprising a container image purchase receiving unit that receives purchase of a container image to be used from user.

3. The system according to claim 1, wherein the program group for the execution environment of the application is a distribution file to apply the operating system file if the group is a computer-executable file type, and the program group for the execution environment of the application is a part of the distribution file, the runtime file, and the library file to apply the operating system if the group is not a computer-executable file type.

4. A method for distributing a container image, comprising:
   registering a container image that includes an application and a program group for the execution environment of the application;
   receiving start instruction to start the registered container image;
   receiving selection of a platform that distributes the container image instructed to be started;
   distributing the container image instructed to be started to the selected platform;
   controlling the platform to have an external system to re-distribute the container image distributed to the platform; and
   instructing the platform to create a container from the container image re-distributed on the external system.

5. A computer program product for use in a system for distributing a container image, comprising a non-transitory computer usable medium having a set of instructions physically embodied therein, the set of instructions including computer readable program code, which when executed by the system causes the information processing unit to:
   register a container image that includes an application and a program group for the execution environment of the application;
   receive start instruction to start the registered container image;
   receive selection of a platform that distributes the container image instructed to be started;
   distribute the container image instructed to be started to the selected platform;
   control the platform to have an external system to re-distribute the container image distributed to the platform; and
   instruct the platform to create a container from the container image re-distributed on the external system.

* * * * *